United States Patent [19]

Paiken

[11] Patent Number: 5,474,456
[45] Date of Patent: Dec. 12, 1995

[54] EDUCATIONAL READING KIT AND METHOD

[75] Inventor: Lawrence Paiken, Thornhill, Canada

[73] Assignee: Stamp-N-Read Holdings (Proprietary) Limited, Johannesburg, South Africa

[21] Appl. No.: 318,091

[22] Filed: Oct. 5, 1994

[30] Foreign Application Priority Data

Oct. 7, 1993 [ZA] South Africa ............................ 93/4812

[51] Int. Cl.⁶ ................................................... G09B 17/00
[52] U.S. Cl. .......................... 434/178; 434/156; 434/167
[58] Field of Search .................................... 434/178, 156, 434/167, 165, 176, 219

[56] References Cited

U.S. PATENT DOCUMENTS

| | | | |
|---|---|---|---|
| 1,120,681 | 12/1914 | Browning | 434/176 |
| 2,946,137 | 7/1960 | Worth et al. | 434/178 |
| 2,972,821 | 2/1961 | Bond | 434/178 |
| 4,437,837 | 3/1984 | Schnettler et al. | 434/178 |
| 4,702,700 | 10/1987 | Taylor | 434/168 |
| 4,714,275 | 12/1987 | Engel et al. | 434/178 |
| 5,141,439 | 8/1992 | Cousins | 434/178 |

Primary Examiner—Edgar S. Burr
Assistant Examiner—Lynn D. Hendrickson
Attorney, Agent, or Firm—Burns, Doane, Swecker & Mathis

[57] ABSTRACT

A reading kit comprises at least one sheet of text, a set of rubber stamps, and an ink pad. The text is in the form of a storyline of which key portions have been omitted. Each rubber stamp has an image which corresponds to a respective key portion in the text so that a reader may complete the story by stamping the appropriate image onto the sheet using the appropriate rubber stamp and the ink pad. Typically the storyline would be suitable for young children who are learning to read.

6 Claims, 3 Drawing Sheets

FIG. 1

HERE COMES DADDY

It was nearly supper time and where was Daddy? Daniel went to the garden and looked up and down the He saw a lady pushing a in a __2__   He saw a gardener   __2__ the lawn.
He saw a boy riding a   __2__   and a little spotted

__2__   , but no Daddy yet. Soon someone came along carrying a bag on his shoulder, could this be Daddy?

No, it was the   __2__   He put some letters in the   __2__ next door and walked past. A little   __2__   came up the street. Could Daddy be in it? No, it was the milktruck.

FIG. 3

HERE COMES DADDY

It was nearly supper time and where was Daddy? Daniel went to the garden  and looked up and down the 

He saw a lady pushing a  in a  He saw a gardener  the lawn.

He saw a boy riding a  and a little spotted , but no Daddy yet. Soon someone came along carrying a bag on his shoulder, could this be Daddy? No, it was the  He put some letters in the  next door and walked past. A little  came up the street. Could Daddy be in it? No, it was the milktruck.

EDUCATIONAL READING KIT AND METHOD

BACKGROUND TO THE INVENTION

This invention relates to games and educational material for children. More specifically it relates to a text wherein the reader provides part of the story by adding missing text, based on clues contained in the preceding and subsequent portions of the text.

It is known to provide stories wherein words are omitted and replaced by graphics which suggest what the missing words should be. More recent versions of this concept include books wherein missing text is added by the reader, typically a child, by way of affixing a sticker bearing the appropriate image into a gap in the text provided for this purpose. While these books are popular, they have the disadvantage of being relatively expensive.

SUMMARY OF THE INVENTION

According to the invention, a reading kit comprises at least one sheet of text, a plurality of rubber stamps, and at least one ink pad; wherein the text consists of a storyline of which key portions have been omitted, and each rubber stamp contains an image corresponding to respective key portions of the text such that, in use, a reader may complete the story by stamping the appropriate image onto the sheet of text using the appropriate rubber stamp and ink pad.

Typically the storyline would be suitable for young children who are learning to read. The text may be selected to be suitable for the entertainment or education of the reader, or for both purposes. Ink pads may be incorporated into the individual rubber stamps, or a separate ink pad may be provided which is adapted to be used to ink-up all of the stamps.

BRIEF DESCRIPTIONS OF THE DRAWINGS

FIG. 1 shows an example of text in accordance with the invention;

FIG. 3 shows the text of FIG. 1 in which certain portions have been completed using the images of FIG. 2.

DESCRIPTION OF THE PREFERRED EMBODIMENT

Figure 2:
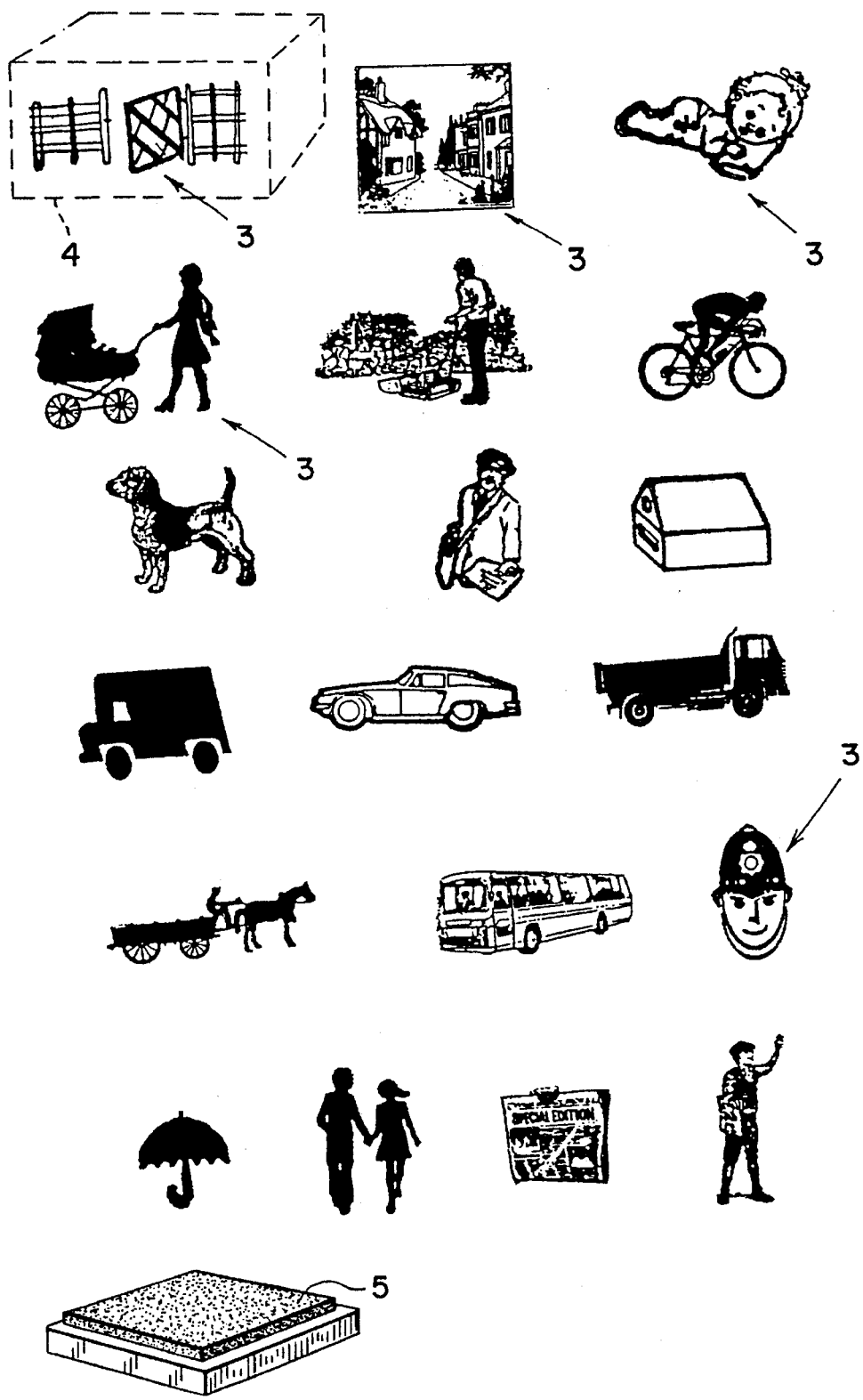
FIG. 2 shows a selection of images for use with the text of FIG. 1.

Referring initially to FIG. 1, a sheet of text 1 contains a storyline having a series of gaps 2 therein. The text is so set out that the text preceding and following each gap 2 suggests the nature of the missing text.

FIG. 2 shows a plurality of images 3 selected to complete the storyline by their insertion into the gaps in the text. These images are contained on the faces of a plurality of rubber stamps depicted by dotted lines 4. In use, the reader of the text may, at each gap in the text, decide the nature of the missing text, select a rubber stamp bearing an image the corresponding to the missing text, ink this stamp using an ink pad 5 and stamp the appropriate image in the corresponding gap in the text.

FIG. 3 illustrates the sheet of text of FIG. 1 in which the gaps in the text have been completed by the insertion of stamped images from those shown in FIG. 2.

The illustrated text contains a storyline suited to a person learning to read. Other forms of storyline may also be used, including those with a more overtly educational aim, as well as those aimed at older children or even adults, for either education or entertainment, or a combination of both.

Any form of rubber stamp may be used, including self-inking pads. For children, and to increase the fun aspect of the activity, rubber stamps with one or more separate inked pads are preferred. Where more than one pad is provided, these may be of different colours to provide variety. A washable ink is preferred in order to minimise the possibility of damage to household furnishings and fittings by small children.

The text is preferably printed on paper which will readily accept the stamped images. That paper will preferably also be suitable for colouring-in with wax crayons or the like so that the printed images can be coloured-in. The kit will preferably be supplied with a plurality of different story sheets or books but the storyline of each will be adapted to be completed using the same set of rubber stamps supplied with the kit.

I claim:

1. A reading kit comprising at least one sheet of text, a plurality of rubber stamps, and at least one ink pad; wherein the text comprises a storyline of which key portions have been omitted, and each rubber stamp contains an image corresponding to said omitted key portions of the text such that, in use, a reader may complete the story by stamping the appropriate image for a specific omitted portion onto the sheet of text using the rubber stamp appropriate to said specific portion.

2. A reading kit according to claim 1 wherein the kit contains a number of different sheets of text, each sheet of text consisting of a storyline of which key portions have been omitted, the key portions of the different texts corresponding with each other, at least to an extent, so that the same rubber stamps can be used to complete the storylines of the different texts.

3. A reading kit according to claim 2 wherein at least some of the images comprise picture outlines so that the stamped image provides an outline picture which can be coloured in by the reader.

4. A reading kit according to claim 1 wherein the rubber stamps each incorporate an ink pad.

5. An educational reading method comprising the steps of:

reading at least one sheet of text containing a storyline from which key portions have been omitted;

selecting rubber stamps containing images corresponding to respective ones of said omitted key portions, applying ink to said images; and stamping said images onto said sheet where said respective key portions have been omitted.

6. A reading method according to claim 5, wherein said images stamped onto said sheet are in the form of outline pictures, and further comprising the step of coloring-in said images.

* * * * *